W. F. COCHRANE.
Thrashing Machine.
No. 37,130.
Patented Dec. 9, 1862.
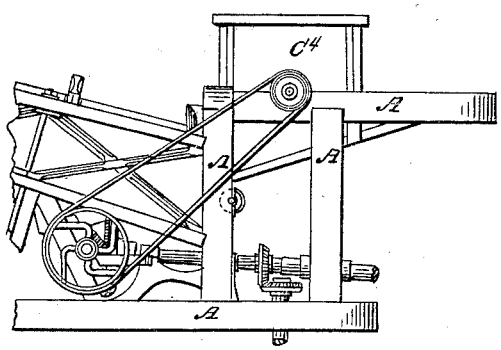
Fig. 1,
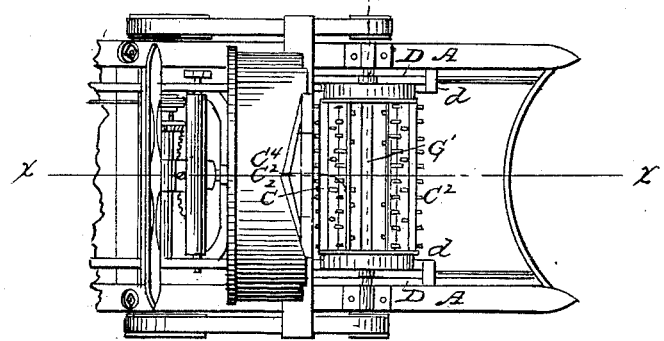
Fig. 2,
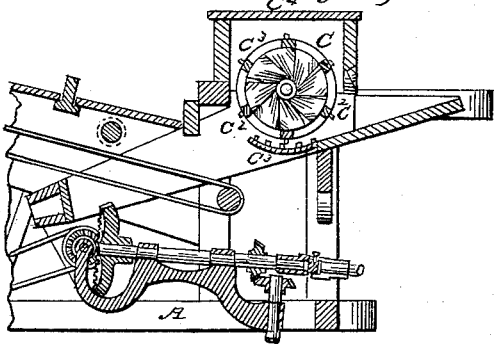
Fig. 3,
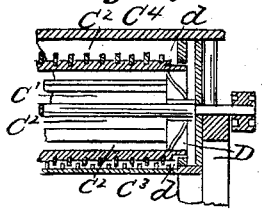
Fig. 4,
Witnesses:
Inventor

UNITED STATES PATENT OFFICE.

WILLIAM F. COCHRANE, OF SPRINGFIELD, OHIO, ASSIGNOR TO HIMSELF AND WARDER & CHILD, OF SAME PLACE.

IMPROVEMENT IN GRAIN-THRASHERS AND SEPARATORS.

Specification forming part of Letters Patent No. 37,130, dated December 9, 1862.

*To all whom it may concern:*

Be it known that I, WILLIAM F. COCHRANE, of Springfield, in the county of Clarke and State of Ohio, have invented certain new and useful improvements in machinery for threshing and separating grain, of which the following is a full, clear, and exact description, reference being had to the accompanying drawings, which make part of this specification, and in which—

Figure 1 represents a view in elevation of a portion of a machine for thrashing and separating grain, embracing my improvements. Fig. 2 represents a plan or top view of the same, with the casing of the cylinder turned back on its hinges. Fig. 3 represents a vertical longitudinal section through the same at the line $x\ x$ of Fig. 2, and Fig. 4 represents a vertical transverse section through a portion of the same at the line $y\ y$ of Fig. 2.

The improvements claimed under this patent consist, first, in mounting the fans directly upon the cylinder-shaft and inside of the thrashing-cylinder, by which arrangement the machine is rendered comparatively less expensive to build, and requires less power to drive it; secondly, in combining a thrashing-cylinder, formed of parallel bars, and having fans in its ends, with a blast-spout so arranged that the air shall be drawn from the interior of the cylinder through the fans and discharged through the blast-spout upon the screens or riddles.

In the accompanying drawings, which represent a convenient arrangement of parts for carrying out the objects of my invention, the mechanism is shown as mounted in a stout frame, A. The thrashing-cylinder, in this instance, consists of two fans, C, forming heads or drums, mounted on a shaft C', and connected by a series of parallel bars, $C^2$, armed with spikes. A concave, $C^3$, is arranged beneath the cylinder. These fan-blades are so arranged as to suck the air from the interior of the cylinder and drive it through the blast-spout D, which lead to the shaking shoe or screens. For convenience of access to the fans the casing $C^4$ is hinged (or otherwise made removable) so as to permit it to be turned back into the position shown in Fig. 2. Partitions $d$ (corresponding with the blast-spouts) are arranged inside this casing so as to fit closely the periphery of the fan-drums C, and thus prevent the air from entering the fans, except through the cylinder. This arrangement is clearly shown in Fig. 4.

It is deemed unnecessary here to describe in detail the construction and operation of the other parts of the mechanism, as they form no part of the subject-matter herein claimed, and, besides, are fully described in two other applications filed simultaneously with this, and marked respectively Divisions G and H.

What I claim under this patent as my invention is—

1. Mounting the fans directly upon the cylinder-shaft and inside the thrashing-cylinder, substantially in the manner described, for the purposes set forth.

2. The combination of an open-barred cylinder, having fans in its ends, with the blast-spouts when arranged and operating substantially in the manner herein described, for the purpose specified.

In testimony whereof I have hereunto subscribed my name.

WILLIAM F. COCHRANE.

Witnesses:
WM. WARDER,
JOHN H. WARDER.